United States Patent [19]

Wagner

[11] 4,233,710
[45] Nov. 18, 1980

[54] MOLDING APPARATUS

[75] Inventor: Richard C. Wagner, Frankfort, Ill.

[73] Assignee: Hollymatic Corporation, Park Forest, Ill.

[21] Appl. No.: 944,000

[22] Filed: Sep. 20, 1978

[51] Int. Cl.² .............................................. A22C 7/00
[52] U.S. Cl. .................................... 17/32; 425/205; 425/256; 425/561; 425/587; 425/812
[58] Field of Search ............... 425/812, 256, 587, 561, 425/205; 17/32

[56] References Cited

U.S. PATENT DOCUMENTS

| | | | |
|---|---|---|---|
| 2,359,674 | 10/1944 | Pollock | 425/812 |
| 3,028,625 | 4/1962 | Dawson | 425/812 |
| 3,386,129 | 6/1968 | Holly | 17/32 |
| 3,964,127 | 6/1976 | Holly | 17/32 |
| 4,113,415 | 9/1978 | Holly | 425/812 |
| 4,153,974 | 5/1979 | Holly et al. | 17/32 |

FOREIGN PATENT DOCUMENTS 2352878  4/1975  Fed. Rep. of Germany ........... 425/812

Primary Examiner—James H. Derrington
Attorney, Agent, or Firm—Wegner, Stellman, McCord, Wiles & Wood

[57] ABSTRACT

A molding apparatus for molding a pressurized plastic material of the nature of ground meat or other food such as ground fish and the like in which the apparatus comprises a movable mold having a mold opening for receiving a pressurized charge of the material, with the mold being movable between mold opening filling and article discharge positions, an entrance to the mold opening at the filling position, means for directing the pressurized charge through this entrance at the filling position and into the mold opening and vent means spaced from the mold opening entrance for venting from the mold opening air displaced by the pressurized charge entering the mold opening. The vent means comprises a plurality of elongated slots extending from the mold opening in the filling position on the side opposite to the mold entrance and exhausting to the exterior of the apparatus.

9 Claims, 6 Drawing Figures

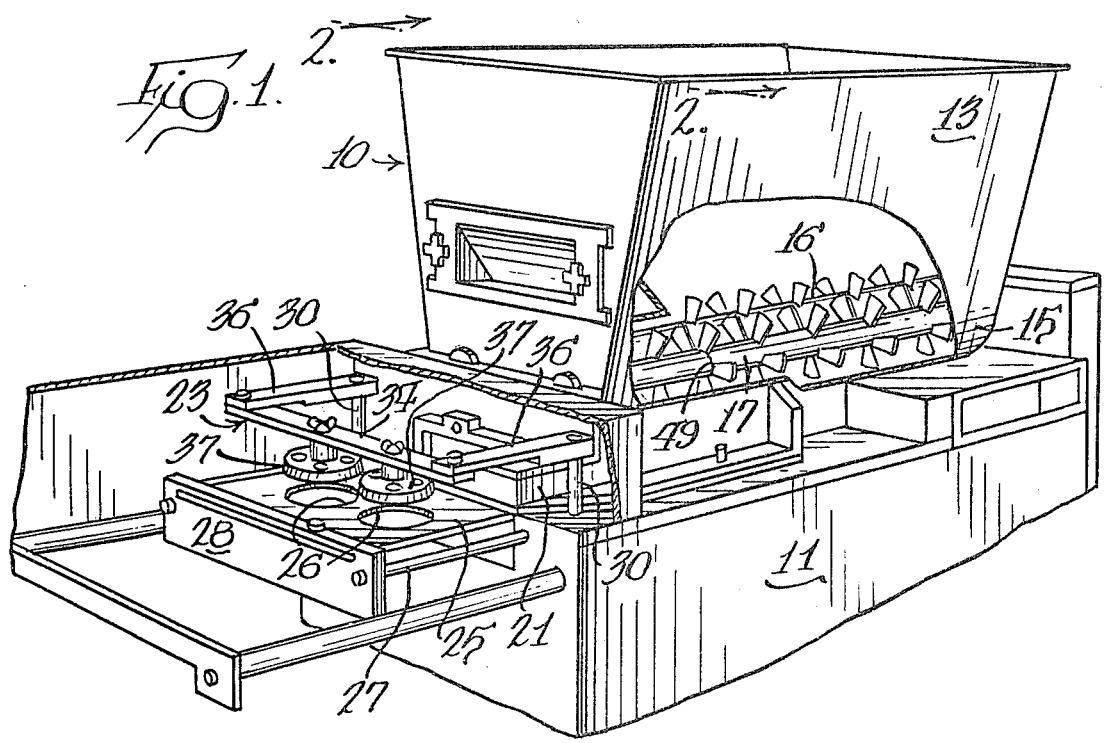
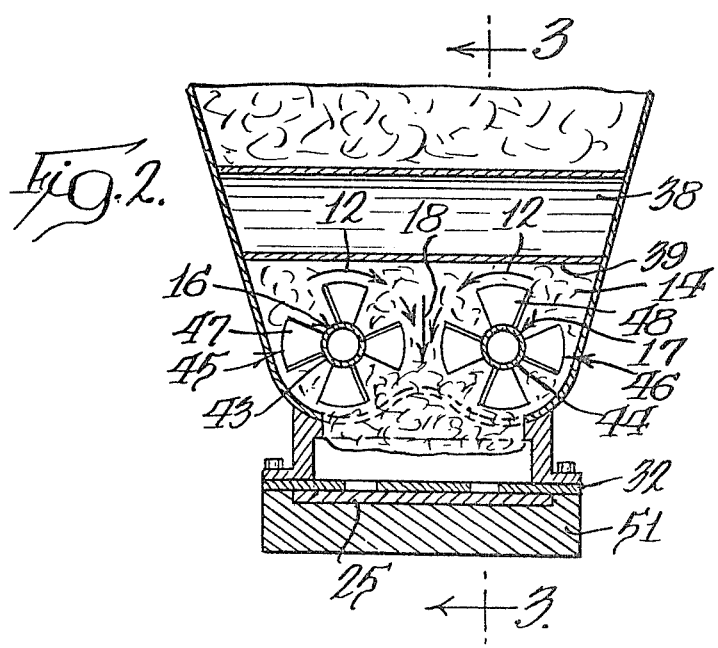

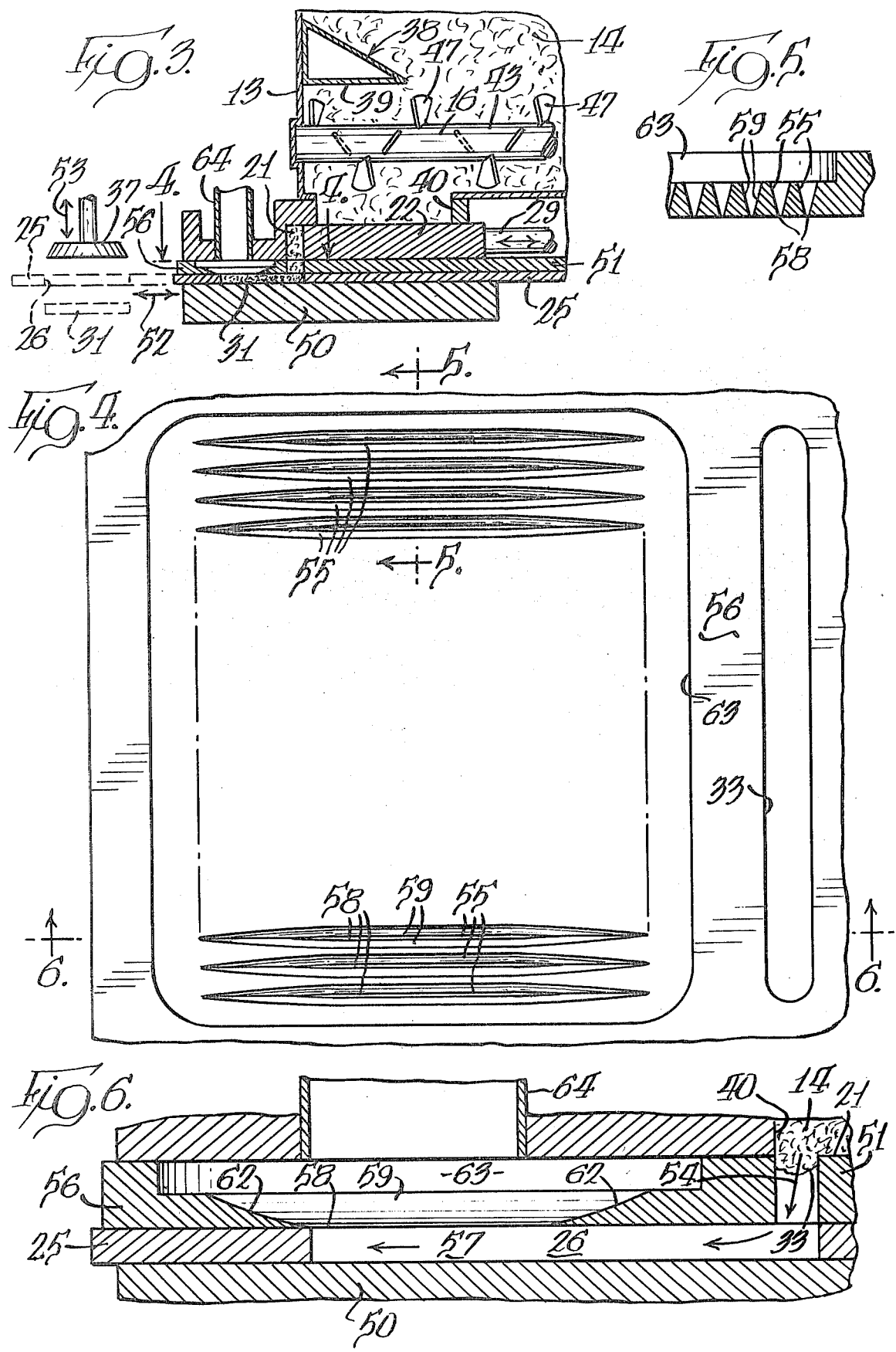

MOLDING APPARATUS

BACKGROUND OF THE INVENTION

In molding a food material such as ground raw beef to make flat hamburger patties the meat is customarily forced under pressure into a mold opening of the shape of the desired article, whether a flat round patty, a flat chop shaped patty or the like. This mold opening contains entrapped air which if not released either requires great pressure on the meat with consequent meat degradation or prevents a perfectly shaped patty being formed as the air tends to prevent the mold opening being completely filled with the food material.

One of the features of this invention is to provide an improved vent means that communicates with the mold opening during filling with the pressurized material so that air displaced by the entering pressurized charge of material can fill the mold without substantial resistance thereby permitting relatively low filling pressure and insuring that the molded articles will be well filled with the material.

BRIEF DESCRIPTION OF THE DRAWINGS

FIG. 1 is a fragmentary perspective view partially broken away of a hamburger patty molding device embodying the the invention.

FIG. 2 is a fragmentary sectional view taken substantially along line 2—2 of FIG. 1.

FIG. 3 is a fragmentary sectional view of the front end of the apparatus and taken substantially along line 3—3 of FIG. 2.

FIG. 4 is a fragmentary plan view of the air release cover plate for the mold opening in which the air release slots are located and taken substantially along line 4—4 of FIG. 3.

FIG. 5 is a fragmentary sectional view taken substantially along line 5—5 of FIG. 4.

FIG. 6 is a fragmentary sectional view taken substantially along line 6—6 of FIG. 4.

The device shown in the accompanying drawings is similar to the patty machine shown in copending U.S. Pat. No. 4,153,974, issued May 15, 1979 and assigned to the assignee hereof. The pair of feed augers 16 and 17 are the same as those described and claimed in my copending application Ser. No. 934,819, filed Aug. 18, 1978, and also assigned to the assignee hereof.

DESCRIPTION OF THE PREFERRED EMBODIMENT

The molding device 10 comprises a cabinet 11 carrying at its top a hopper 13 for holding the material to be molded such as ground or otherwise finely divided food material and particularly ground raw beef 14 for molding flat hamburger patties. Located within the hopper bottom 15 are a pair of parallel feed augers 16 and 17 that are rotated with their tops moving toward each other as indicated by the arrows 12 in FIG. 2 to feed the material down between them as indicated by the arrows 18.

Located beneath the forward ends of the hopper 13 and augers 16 and 17 is a pressure chamber 21 in which is reciprocated a pressure ram 22. The molding device is provided with a reciprocable mold plate 25 for molding flat patties 31 from the finely divided food material such as the ground raw beef. The mold plate 25 has a pair of transversely arranged mold openings 26 each of circular configuration in this illustrated embodiment.

The mold plate 25 is driven in the customary manner in a horizontal plane between a retracted filling position as shown in FIG. 3 and a fully extended patty removal position shown in broken lines in FIG. 3 and in perspective in FIG. 1. This driving mechanism includes parallel drive rods 27 that are connected at their forward ends to a vertical cross plate 28 to which the forward end of the mold plate 25 is attached as shown in FIG. 1.

The pressure ram 22 that is located in the pressure chamber 21 is reciprocated in a horizontal path by a pair of horizontal drive bars 29 of which only one is shown in FIG. 3.

The horizontally reciprocable pressure ram 22 is supported on top of a fill or base plate 51 that is provided with a fill slot 33 for each mold opening 26 when the mold is in the filling position of FIG. 3. In order to remove the shaped patty 31 from the mold opening there is provided a knockout device 23 comprising parallel side bars 36 and a cross bar 34 on which are located a pair of knockout cups 37. The knockout device 23 is raised to the elevated position shown in FIG. 1 by a customary cam operated mechanism (not shown) that includes the reciprocably mounted vertical side rods 30. As stated, the knockout device 23 and the operating structure therefor are all conventional.

Within the hopper 13, at the front or left end as viewed in the drawings, there is provided an inwardly directed baffle 38 that has a flat bottom 39 at the front end and above the augers 16 and 17. As is shown in FIG. 3, the baffle 37 is located immediately above an exit opening 40 at the forward end of the hopper 13. This opening 40 leads directly to the pressure chamber 21 in which the ram 22 is reciprocable as previously explained.

The bottom 39 of the baffle 38 is spaced about 0.25 to 1 inch, with 0.75 inch being especially preferred, from the tops of the screws of the augers with this spacing being dependent upon the character, which is the flow property, of the material being molded, the consistency, the size of the patties and other well known factors.

The augers 16 and 17 are rotated as indicated by the arrows 12 in FIG. 2 by the customary drive (not shown). Each auger comprises a shaft 43 with one or both of the two augers including spaced screw segments 47. Each set of segments 47 extends radially away from its shaft and lies generally along a helix. Each segment is of uniform width and is spaced from 40° to 120°, such as 80°, apart. In the customary hamburger patty molding device of this invention, each segment 47 is 0.5 to 2 inches wide with parallel sides. A satisfactory width is 1.5 inches.

As is shown in FIG. 2 the two augers have parallel shafts 43 and 44 each with its helically arranged screw 45 and 46 and each with its above-described screw segments 47 and 48.

The horizontally reciprocable mold plate 25 with its mold opening 26 of generally circular shape for molding a flat patty slides upon a base plate 50 in a generally horizontal direction as indicated by the arrow 52. The knockout cups 37 are moved vertically by conventional means as indicated by the arrow 53.

In order that the entering pressurized charge 54 of material such as ground raw beef that is pressed forwardly by the forward movement of the ram 22 will displace air from the mold opening 26, there are provided vent means 55 spaced from the mold opening entrance means here shown as the elongated fill slot 33 for each mold opening. This vent means comprise a plurality of elongated air vents or openings 55 in plate 51 which thereby serves as a vent plate 56 that overlies the end of the mold opening 26, here the forward end 57, that is directly opposite to the mold entrance 33. In the illustrated embodiment there are 19 of these air vent openings or slots 55 and each has a narrow entrance 58 which may be 0.015 inch wide and may vary between 0.010 to 0.020 inch wide on a practical basis. These slots 55 have upwardly flaring sides 59 which in this embodiment are 30° to each other for each slot 55. A practical range is from 20° to 40°.

As can be seen from FIGS. 5 and 6, each air release slot 55 therefor flares laterally at the sides 59 and likewise flares longitudinally at the ends 62. The slots 55, which are $1\frac{1}{2}$ to $2\frac{1}{2}$ inches long at the narrow end 58, such as 2 inches, and $3\frac{1}{2}$ to $4\frac{1}{2}$ inches long at the top end 65, such as 4 inches, exhaust into an overlying chamber 63 for the air and any entrapped material portion such as liquid or fine solids from the food material. From here the air is vented upwardly through a vertical stack 64 to the exterior.

Where the air openings 55 are provided with entrances 58 of 0.015 inch width, the spacing between adjacent slots at these entrances may be about 0.25 inch.

The provision of the narrow but upwardly flaring slots 55 for venting air offers a large vent area even at the narrowest point of the slots which are at the entrances 58 first contacted by the material being molded such as ground raw beef. Thus there can be considerable blockage of each slot at this entrance while still providing ample area for efficient escape of the air. Also, these elongated air escape slots 55 given almost complete coverage of the forward portion of the mold as shown in FIG. 6, for example, so that there is very little entrapment of air within the mold opening. In addition, the slots are much easier to cut in the air breather plate relative to other forms of air escape means such as closely adjacent holes. By flaring both transversely and longitudinally, the slots tend to be self-cleaning as foreign material will in large measure be blasted upwardly through the slots into the collecting chamber.

Having described my invention as related to the embodiment shown in the accompanying drawings, it is my invention that the invention be not limited by any of the details of description, unless otherwise specified, but rather be construed broadly within its spirit and scope as set out in the appended claims.

I claim:

1. Apparatus for shaping a flat article from moldable food material of the nature of ground meat, comprising: a movable mold plate plate having a mold opening through the plate for receiving a pressurized charge of said material for said shaping of said article; spaced plates between which said mold plate is movable between mold opening filling position and article discharge position, said plates comprising means for confining the opposite sides of said mold opening at said mold filling position and thereby means for forming enclosing parts of said mold opening for said shaping, one of said plates comprising a vent plate; an entrance means to said mold opening at said mold filling position; means for directing said pressurized charge through said entrance means at said filling position and into said mold opening for said shaping of said articles; and a plurality of elongated slots in said vent plate extending longitudinally essentially parallel to said mold plate and spaced from said mold opening entrance means when said mold plate is in said filling position for venting from said mold opening air displaced by said pressurized charge entering said mold opening wherein each said slot comprises a narrow air entrance side adjacent to said mold opening joinded to a wider air exhaust side spaced from said mold opening wherein each said slot comprises a narrow air entrance side adjacent to said mold opening joined to a wider air exhaust side spaced from said mold opening has been added.

2. The apparatus of claim 1 wherein each said slot flares laterally of said slot from said air entrance side to said air exhaust side.

3. The apparatus of claim 1 wherein each said slot flares laterally of said slot from said air entrance side to said air exhaust side and flares longitudinally of said slot from said entrance portion to said exhaust portion.

4. The apparatus of claim 1 wherein there is provided means forming an air exhaust chamber communicating with said elongated slots and an air exit stack leading from said chamber to the exterior of said apparatus.

5. The apparatus of claim 1 wherein there is provided a pressure applying ram reciprocable in a longitudinal path for providing pressure on said material thereby resulting in said pressurized charge and said elongated slots are elongated in a direction substantially parallel to said ram path.

6. The apparatus of claim 5 wherein each said slot flares laterally of said slot from said air entrance side to said air exhaust side.

7. The apparatus of claim 5 wherein each said slot flares laterally of said slot from said air entrance side to said air exhaust side and flares longitudinally of said slot from said entrance side to said exhaust side.

8. The apparatus of claim 5 wherein there is provided means forming an air exhaust chamber communicating with said elongated slots and an air exit stack leading from said chamber to the exterior of said apparatus.

9. The apparatus of claim 1 wherein said elongated slots are arranged side-by-side and essentially parallel to each other.

* * * * *